(12) United States Patent
Pariseau et al.

(10) Patent No.: US 12,354,168 B2
(45) Date of Patent: Jul. 8, 2025

(54) SYSTEM AND METHOD FOR DYNAMICALLY MANAGING A DIGITAL CARD IN AN ELECTRONIC WALLET

(71) Applicant: THE TORONTO-DOMINION BANK, Toronto (CA)

(72) Inventors: Sacha-Rene Pariseau, Montreal (CA); Kelvin Chun-Yin Lo, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 19 days.

(21) Appl. No.: 17/187,417

(22) Filed: Feb. 26, 2021

(65) Prior Publication Data

US 2022/0277396 A1  Sep. 1, 2022

(51) Int. Cl.
*G06Q 40/08* (2012.01)
*H04L 67/55* (2022.01)

(52) U.S. Cl.
CPC ............. *G06Q 40/08* (2013.01); *H04L 67/55* (2022.05)

(58) Field of Classification Search
CPC ......... H04L 67/26; H04L 67/55; G06Q 40/08; G06Q 20/351
See application file for complete search history.

(56) References Cited

U.S. PATENT DOCUMENTS

| | | | |
|---|---|---|---|
| 8,112,494 B2 * | 2/2012 | Maghraby | H04H 60/40 709/217 |
| 9,507,608 B2 * | 11/2016 | Chaudhri | G06F 3/04817 |
| 10,621,574 B1 | 4/2020 | Rao | |
| 10,636,096 B1 * | 4/2020 | Carlson | G06Q 40/08 |
| 10,713,652 B1 * | 7/2020 | Baird | G06Q 20/3276 |
| 10,726,401 B2 | 7/2020 | Hertel et al. | |
| 10,776,876 B1 * | 9/2020 | Ketharaju | G06Q 20/351 |
| 10,839,354 B1 * | 11/2020 | Hughes | G06F 3/04883 |
| 11,010,758 B2 * | 5/2021 | Sooudi | G06Q 20/3224 |

(Continued)

FOREIGN PATENT DOCUMENTS

| | | |
|---|---|---|
| WO | 2014/011691 A1 | 1/2014 |
| WO | 2019/219982 A1 | 11/2019 |
| WO | 2019/234420 A1 | 12/2019 |

OTHER PUBLICATIONS

"Introducing: Digital Pink Cards for Auto Insurance", Regal Insurance, https://www.regalinsurance.com/introducing-digital-pink-cards-for-auto-insurance/ (accessed Feb. 26, 2021).

*Primary Examiner* — Bennett M Sigmond
*Assistant Examiner* — Bolko M Hamerski

(57) ABSTRACT

A mobile computing device configured to manage a digital wallet card within a mobile wallet on the device by communicating with a central server. The mobile computing device continually communicates with the central server that stores policy information for an account associated with the digital wallet card. If the central server detects an update to the digital wallet card then, based on such indication, the mobile computing device generates an alert such as a notification to be displayed on a user interface of the mobile computing device indicating the existence of the update. The mobile computing device displays concurrently the notification of an update and an embedded link that when selected triggers downloading the update and replacing the digital wallet card with an updated digital wallet card in the mobile wallet.

19 Claims, 5 Drawing Sheets

(56) References Cited

U.S. PATENT DOCUMENTS

| | | | |
|---|---|---|---|
| 2007/0198432 A1* | 8/2007 | Pitroda | G06Q 20/327 |
| | | | 705/64 |
| 2007/0241189 A1* | 10/2007 | Slavin | G06Q 30/02 |
| | | | 235/383 |
| 2016/0180332 A1* | 6/2016 | Wilczynski | G06Q 20/36 |
| | | | 705/41 |
| 2016/0210699 A1* | 7/2016 | Meoli | G06F 40/103 |
| 2016/0283923 A1* | 9/2016 | Hertel | G07F 9/001 |
| 2017/0316515 A1* | 11/2017 | Varma | H04L 67/306 |
| 2018/0158048 A1 | 6/2018 | Narasimhan et al. | |
| 2018/0253721 A1* | 9/2018 | Gupta | G06Q 20/3223 |
| 2018/0293574 A1* | 10/2018 | Sooudi | G16H 20/10 |
| 2019/0073665 A1* | 3/2019 | Belleville | G06Q 20/3672 |
| 2020/0193417 A1* | 6/2020 | Dao | G06Q 20/36 |

* cited by examiner

SYSTEM AND METHOD FOR DYNAMICALLY MANAGING A DIGITAL CARD IN AN ELECTRONIC WALLET

FIELD

The present disclosure generally relates to a system and method for dynamically managing a digital card, being a dynamic electronic representation of a physical card such as an insurance card, in an electronic wallet.

BACKGROUND

Currently, certain physical cards such as insurance cards (including vehicle insurance cards, or "pink cards") are maintained as physical copies and kept on or close to the insurance card user as they may be required for immediate access.

Carrying physical copies of such cards such as insurance cards for auto, home, or business presents a risk of losing or damaging the insurance card, as well as necessitating the creation of new physical cards to reflect any policy updates to the insurance policy connected to that card. Prior physical cards may thus lead to inaccurate and out of date information. Alternatively, storing digital photos or scans of the physical cards would have similar issues of lack of reliability of the information presented. Additionally, granting access to stored digital photo or scan or copy of the digital card means potentially allowed unwanted users access to an unlocked mobile device which may present other security concerns. Considering the importance of insurance cards, especially vehicle insurance cards, there is a clear need for a computerized method and system to improve maintaining and updating a digital version of card(s) included in a digital wallet of a mobile computing device for improved access and reliability.

SUMMARY

In one aspect, there is provided an improved method of maintaining electronic digital cards such as insurance cards and notifying a policy holder of updates to their insurance policy, as well as to keep the policy information on the insurance card up-to-date by providing a means of automatically and dynamically updating the policy information based on real-time policy updates.

In at least some implementations, the proposed solution is meant to move away from a physical card and instead recreate the physical insurance card within the policy holder's mobile computing device in a way that conveniently improves access, security and accuracy of the corresponding digital card. Through the use of a digital insurance card maintained within a digital wallet on a mobile computing device, the digital card will conveniently be easy to store and access and the policy information on the insurance card will remain up-to-date through methods and systems disclosed herein. In at least some aspects, this may be provided via continuous monitoring of the insurance card's policy information (e.g. sending status check messages to a central server), including prompt and automatic updating of the policy whenever an update becomes available.

In one or more aspects, the disclosure relates to a digital card management application and more particularly, to a system for storing a digital insurance card within a digital wallet on a user interface of a mobile computing device, and automatically updating that digital card based on update links embedded in notifications displayed on a user interface in a number of possible digital formats (e.g. text, SMS, display within a financial management application, display on a lock screen). For example, this display may include the notification and embedded update link displayed directly onto the lock screen of the user interface of the mobile computing device.

According to one aspect of the present disclosure there is provided a mobile computing device communicating with a central server in order to manage a digital wallet card within a mobile wallet on the device, the mobile computing device comprising a processor, a storage device, and a communication device where each of the storage device, and the communication device is coupled to the processor, the storage device storing instructions, which when executed by the processor, configure the mobile computing device to: continually monitor, via communication with the central server having a policy information database that stores policy information for an account associated with the digital wallet card, whether there is an update to the digital wallet card; and generate, in response to receiving said update from the central server, a notification displayed on a user interface of the mobile computing device indicating an existence of the update, the notification displayed concurrently with an embedded link that when selected triggers downloading the update thereby automatically replacing the digital wallet card with an updated digital wallet card in the mobile wallet.

In at least some implementations, the mobile computing device that may be configured to continually monitor the central server further comprises sending, periodically, a status check message from the device to the central server, the status check message comprising current account information in the digital wallet card to request determination of whether the update exists for the digital wallet card.

In at least some implementations, upon the mobile computing device receiving the notification and the embedded link, the instructions may configure the device to automatically select the embedded link and thereby automatically update the digital wallet card to the updated digital wallet card based on said update including policy amendment information reflecting a policy change for the account.

In at least some implementations, the instructions may further configure the mobile computing device to: display the notification of the update on a lock screen of the user interface of the mobile computing device to indicate that the update exists and the embedded link is displayed concurrently on the lock screen for selection to trigger the update to the digital wallet card.

In at least some implementations, the instructions may further configure the mobile computing device to: store a set of customizable notification settings on a storage device of the mobile computing device, the notification settings displayed and customizable via the user interface for defining how the notification of the update is displayed on the user interface.

In at least some implementations, the instructions may configure the mobile computing device to communicate the notification settings with the central server for customizing the notifications.

The notification settings communicated with the central server may define at least one of: a frequency with which to receive the notification; and, a preferred receipt method for displaying the notification on the mobile computing device, the receipt method consisting of: email, SMS, presented on a software application on the mobile computing device, and displayed on a lock screen of the mobile computing device.

In at least some implementations, the digital wallet card may represent a physical card and is created on the mobile wallet by the instructions configuring the mobile computing device to: retrieve a policy information package from the central server with the policy information comprising details for the account associated with the digital wallet card; and, format the retrieved policy information according to a format information scheme retrieved from a content management system (CMS) specific to display capabilities for the mobile computing device.

In at least some implementations, the digital wallet card may represent an electronic representation of a vehicle insurance card.

In at least some implementations, the digital wallet card may be displayed on the lock screen of the mobile computing device without having to unlock the mobile computing device.

In at least some implementations, the digital wallet card may be shared with other mobile computing devices that are associated with the insurance policy.

In at least some implementations, there is provided a computer program product for using a mobile computing device to communicate with a central server in order to manage a digital wallet card within a mobile wallet on the mobile computing device, the computer program product comprising a non-transient storage device storing instructions that when executed by at least one processor of a mobile computing device, configure the mobile computing device to: continually monitor, via communication with a central server having a policy information database that stores policy information for an account associated with a digital wallet card on the mobile wallet of the mobile computing device, whether there is an update to the digital wallet card; and generate, in response to receiving said update from the central server, a notification displayed on a user interface of the mobile computing device indicating an existence of the update, the notification displayed concurrently with an embedded link that when selected triggers downloading the update thereby automatically replacing the digital wallet card with an updated digital wallet card in the mobile wallet.

It is to be understood that both the foregoing description and the following detailed description are exemplary and explanatory only and are not restrictive of the disclosure. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Generally, in at least one or more aspects of the present disclosure, there is provided a system and method for managing and updating a digital wallet card (e.g. one or more insurance cards) within a digital wallet located on a mobile computing device through communication with a central server that stores policy information for various accounts of an entity associated with the policy including those related to the digital wallet.

In at least some implementations, the mobile computing device may initially instantiate the physical card into digital card format by first capturing the account information associated with the physical card through the user interface (including details such as the account number or policy number). Using these account details, the mobile computing device may then communicate with a policy information database on the central server in order to retrieve the policy information specific to a policy holder associated with the mobile computing device. Formatting information for the digital card may be retrieved from a content management system (CMS). With the policy information and the formatting information, the mobile computing device may create a digital representation of the physical card within the digital wallet located on the mobile computing device.

In at least some implementations and generally, the disclosed systems and methods may also continuously monitor, through continued communication with the central server, the existence of any updates to the policy (e.g. insurance policy) associated with the digital card. In at least some aspects, when an update is detected, the central server in communication with the mobile computing device, may inform the corresponding API (application programming interface) and unified messaging platform (UMP) to generate an alert on the user interface of the mobile computing device. This alert may be displayed on the user interface in accordance with the mobile computing device's notification settings. These notification settings may determine the frequency and the delivery method of the update notification. Notifications may be provided via email, SMS, directly on an application of the mobile computing device, or in a lock screen of the mobile computing device, etc. The mobile computing device may provide, in at least some aspects, as part of the update notification displayed, an embedded link to automatically update the digital wallet card according to new policy details provided from the central server.

Figure 1:
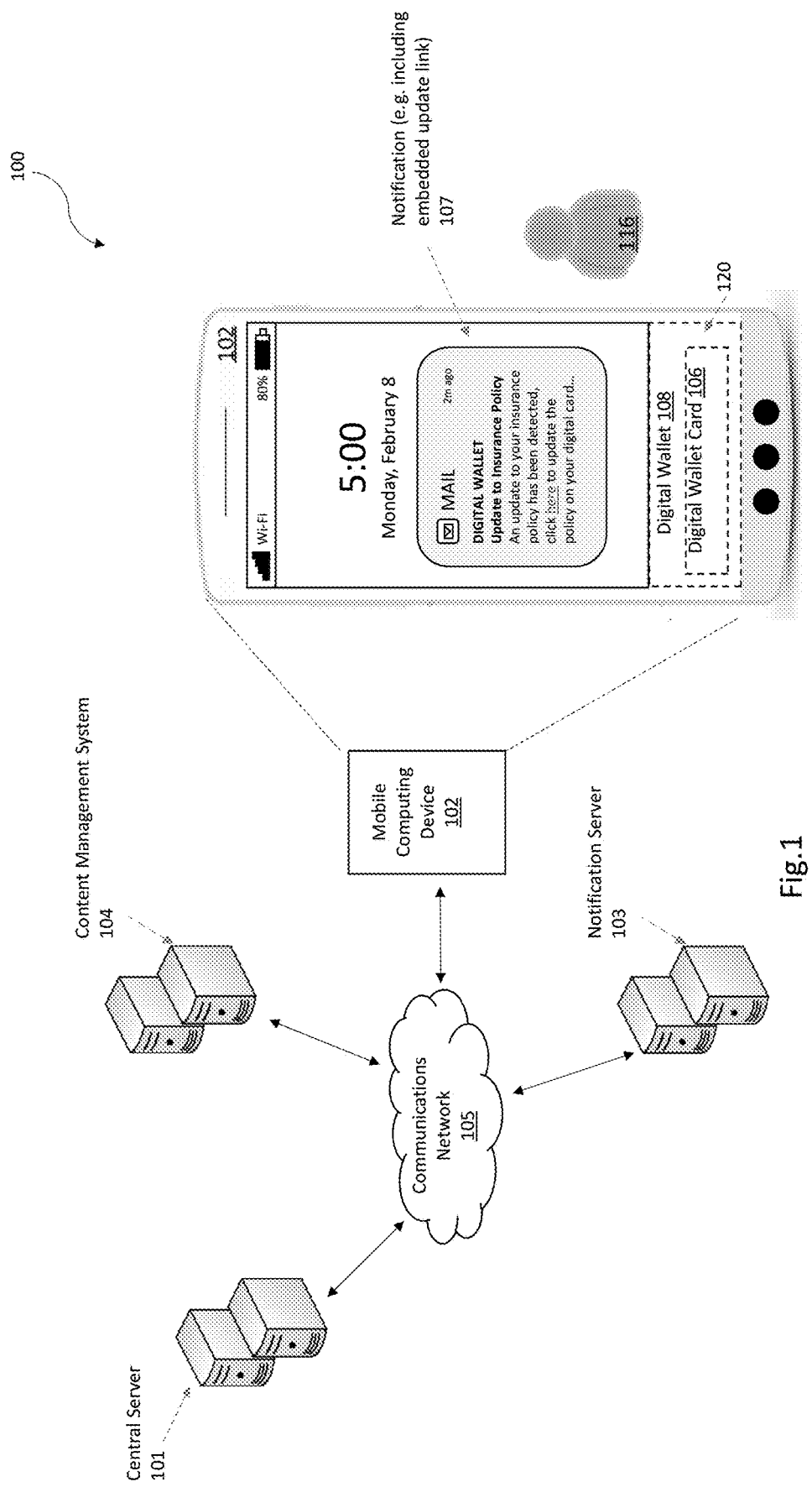
FIG. 1 is a diagram illustrating an example computing device communicating in a communication network and configured to output to dynamically verify and display update notifications for a digital wallet card, in accordance with one or more aspects of the present disclosure.

FIG. 1 is a diagram illustrating an example computer network 100 in which a mobile computing device 102 is configured to communicate with one or more other computing devices, including a central server 101, a content management system 104, and a notification server 103, using a communications network 105.

The mobile computing device 102 is configured to communicate, via the communications network 105, basic account details to the central server 101 (e.g. via a request for policy information for a digital wallet card 106 to be stored on a digital wallet 108 of the mobile computing device 102). In response, the central server 101 is configured to provide policy information corresponding to an account associated with the mobile computing device 102 for composing the digital wallet 108 information. Notably, the central server 101 having a policy information database communicates a policy information package to the mobile computing device 102, the policy information package comprises metadata details for the account associated with the digital wallet card 106 to be held in the digital wallet 108 of the mobile computing device 102. The policy information package is preferably formatted according to a format information scheme retrieved from a content management system 104 (e.g. format may be specifically customized to the mobile computing device 102 and/or the digital wallet 108, including display capabilities of the mobile computing device 102). The content management system 104 is thus configured to manage and communicate, using the communications network 105, the format information scheme specific to the mobile computing device 102 (e.g. such communication may occur via push mechanism or request for formatting information from the central server 101). In some embodiments, the policy information package is formatted on the central server 101 and in alternate embodiments, the policy information package is sent along with the formatting information scheme to the mobile computing device 102 for subsequent processing and formatting to form the digital wallet card 106.

In at least some implementations, the mobile computing device 102 possessing both the policy information package communicated by the central server 101 and the format information communicated (e.g. either directly by the content management system 104 or indirectly via the central server 101), is configured to create the digital wallet card 106. The digital wallet card 106 represents an electronic representation of a physical card, preferably an insurance card such as a vehicle insurance card and is created within the mobile digital wallet 108. The digital wallet card 106 may be stored in the mobile computing device 102 in the form of a file that is accessible as a pass file such as a PKPass file extension.

The digital wallet card 106, once created on the mobile computing device 102, may be communicated to different mobile computing devices (not shown) that are connected to the account associated with the digital wallet card 106, such that multiple mobile computing devices for the account can store the digital wallet card 106 in their respective digital wallets.

In one example, the mobile computing device 102 facilitates viewing the digital wallet card 106 on a lock screen of the mobile computing device (e.g. an example lock screen 120). Notably, the digital wallet card 106 may be displayed on the lock screen (e.g. the example lock screen 120) of the mobile computing device 102, such that the mobile computing device 102 does not need to be unlocked by user 116 via password entry or other unlocking mechanisms in order for the details on the digital wallet card 106 such as policy insurance details to be displayed. Conveniently, this ensures that unwanted users do not gain access to other information stored on the mobile computing device 102.

In another example, the digital wallet card 106 may be displayed on the user interface of the mobile computing device 102 (e.g. via one or more applications accessing the digital wallet 108) after having unlocked the mobile computing device 102 via password entry or other unlocking mechanisms.

In at least some implementations and as will be described in further detail in FIG. 2, the mobile computing device 102 is comprised of at least a processor (e.g. processors 202), a storage device (e.g. storage devices 210), and a communication device (e.g. communication units 206). Each of the storage device 210 and the communication units 206 are coupled to the processor 202. The storage device 210 stores instructions that, when executed by the processor 202, cause the storage device 210 to configure the mobile computing device 102 to communicate with one or more of the central server 101, the notification server 103, and the content management system 104. In at least one aspect, the mobile computing device 102, through this communication with the central server 101, causes the central server 101 to provide updates to the policy information associated with the digital wallet card 106.

In one example, the requests for policy updates from the mobile computing device 102 communicated with the central server 101 may be in the form of periodic status check messages from the mobile computing device 102 to the central server 101. These status check messages may comprise identifying account information associated with the digital wallet card 106 and/or digital wallet 108 to request determination of whether any update exists for the digital wallet card 106.

In at least some implementations, in response to the status check messages, the central server 101 may determine and indicate via a response to the mobile computing device 102 whether an update exists to the digital wallet card 106 and the corresponding updated metadata for the digital wallet card 106 (e.g. policy information and account details) contained therein. Based on receiving the indication that the update exists and the corresponding updated metadata, the mobile computing device 102, generates a notification 107 message indicative of the update including a concurrently displayed link for downloading the update. The mobile computing device 102 displays the notification 107 on the user interface through, for example, a lock screen 120. In some aspects, the mobile computing device 102 may be preconfigured (e.g. via notification settings defined on the mobile computing device 102) to automatically select the embedded link in the notification 107 and thereby automatically update the digital wallet card 106 to the updated digital wallet card based on said update.

The mobile computing device 102, the central server 101, the notifications server 103 and the content management system 104 are coupled for communication to the communications network 105 which may comprise a wide area network (WAN) such as the Internet. It is understood that the communications network 105 is simplified for illustrative purposes. The communications network 105 may comprise additional networks coupled to the WAN such as a wireless network and/or local area network (LAN) between the WAN and the mobile computing device 102 and/or the central server 101 and/or the notifications server 103 and/or the content management system 104.

In at least some implementations, the mobile computing device 102 may thus generate output for display on a user interface such as the notification 107 of an update to the digital wallet card 106 along with an embedded link to download the update from the central server 101, in response to operation of the central server 101 (e.g. providing updated policy information for updating the digital wallet card 106). The output of the mobile computing device 102 may be displayed on other types of screens such as a projector, a monitor, or other display device. It will be understood that the user interface may also operate as an input/output device and may be configured using a variety of technologies (e.g. in relation to input capabilities: resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology; and in relation to output capabilities: a liquid crystal display (LCD), light emitting diode (LED) display, organic light-emitting diode (OLED) display, dot matrix display, e-ink, or similar monochrome or color display).

Figure 2:
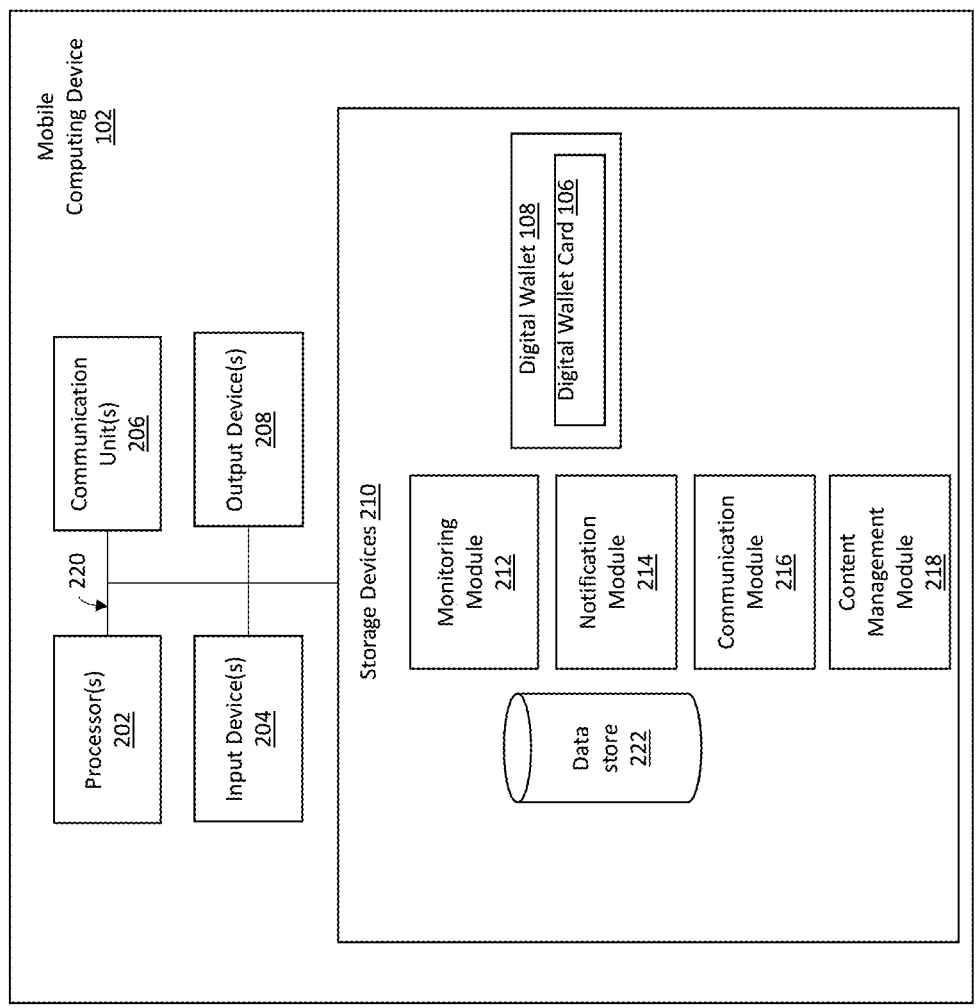
FIG. 2 is a diagram illustrating in further detail the example computing device of FIG. 1, in accordance with one or more aspects of the present disclosure.

In one example, referring to FIGS. 1 and 2, the mobile computing device 102 may be dynamically configured via the central server 101 and/or the storage device 210 of the mobile computing device 102, to display the update notifications 107 (e.g. a notification message indicating an update exists and a link to download such update) directly on the lock screen of the mobile computing device 102. The mobile computing device 102, in one example, may further be configured to continuously monitor via communication with the central server 101 whether any updates become available for the digital wallet card 106. In such an example, when an update to the digital wallet card 106 becomes available, the central server 101 may be configured to communicate via the communications network 105 to the mobile computing device 102, a response notification message about the existence of the update to the digital wallet card 106 including one or more website links or native application links to access and update the digital wallet card 106. The mobile computing device 102 would then receive the notification message from the central server 101 and display the notification 107 indicating existence of an update including the embedded link to receive the updated metadata information for the digital wallet card 106 (e.g. website to access to download the update) directly onto a user interface, e.g. the lock screen of the mobile computing device 102. Further, in one example, the mobile computing device 102 may be configured (e.g. via digital wallet settings previously customized) to automatically trigger the embedded update link thus updating the digital wallet card 106 to the most recent update.

In the example of FIG. 1, the central server 101, the notification server 103, and the content management system 104 are servers. Each of these is an example of a computing device having at least one processing device (e.g. a processor, etc.), a communication device coupled to at least one processing device and at least one memory (e.g. a storage device) storing instructions which, when executed by the processing device configure the computing device to perform operations, including those disclosed herein.

FIG. 2 is a diagram illustrating in block schematic form an example computing device (e.g. the mobile computing device 102 shown in FIG. 1), in accordance with one or more aspects of the present disclosure, for example to provide a system to manage one or more digital wallet cards (e.g. the digital wallet card 106 in FIG. 1) and monitor updates to that card, then to display said update in the form of a notification on a screen of the mobile computing device 102 concurrently with an embedded link that, when triggered (e.g. via selection by a user 116 of FIG. 1 or automatically via settings in the mobile computing device 102) dynamically updates the digital wallet card 106 to the recent update. In at least some aspects, this conveniently, improves the accuracy and reliability of the digital wallet card 106, and reduces unnecessary computational processing as it streamlines the update and notification process.

The mobile computing device 102 comprises one or more processors 202, one or more input devices 204, one of more communication units 206 and one or more output devices 208. The mobile computing device 102 also includes one or more storage devices 210 storing one or more modules such as monitoring module 212 for performing status checks of the digital wallet card 106, notification module 214 for maintaining notification settings and/or displaying notification updates such as notification 107, communication module 216 for communicating with central server 101 and/or content management system 104 and/or notification server 103, and content management module 218 for maintaining content such as identification information within the digital wallet card 106. The communication channels 220 may couple each of the components including the processor(s) 202, the input device(s) 204, the communication unit(s) 206, the output device(s) 208, the storage device(s) 210, the monitoring module 212, the notification module 214, the communication module 216, and content management module 218 for inter-component communications, whether communicatively, physically and/or operatively. In some examples, the communication channels 220 may include a system bus, a network connection, an inter-process communication data structure, or any other method of communicating data.

One or more of the processors 202 may implement functionality and/or execute instructions within the mobile computing device 102. For example, the processors 202 may be configured to receive instructions and/or data from the storage device 210 to execute the functionality of the modules shown in FIG. 2, among others (e.g. operations system, applications, etc.). The mobile computing device 102 may store data/information to the storage devices 210. Some of the functionality is described further herein below.

One or more of the communication units 206 may communicate with external computing devices and servers (e.g. the central server 101 in FIG. 1) via one or more networks (e.g. the communications network 105 in FIG. 1) by transmitting and/or receiving network signals on the one or more networks. The communication units 206 may include various antennae and/or network interface cards, etc. for wireless and/or wired communications.

The input devices 204 and the output devices 208 may include any of one or more buttons, switches, pointing devices, cameras, a keyboard, a microphone, one or more sensors (e.g. biometric, etc.), a speaker, a bell, one or more lights, etc. One or more of same may be coupled via a universal serial bus (USB) or other communication channel (e.g. 220).

The one or more storage devices 210 may store instructions and/or data for processing during operation of the mobile computing device 102. The one or more storage devices 210 may take different forms and/or configurations, for example, as short-term memory or long-term memory. The storage devices 210 may be configured for short-term storage of information as volatile memory, which does not retain shared contents when power is removed. Volatile memory examples include random access memory (RAM), dynamic random access memory (DRAM), static random access memory (SRAM), etc. The storage devices 210, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Referring to FIGS. 1 and 2, the monitoring module 212 may be configured to send status check messages to the central server 101 to query whether there is any update to the information held on the digital wallet card 106 (e.g. whether any of the fields defined on the digital wallet card 106 have been changed since the displayed version). The monitoring module 212 may thus obtain response from the central server 101 providing policy information relating to the account associated with the digital wallet card 106. For example, the monitoring module 212 may retrieve current input account information for the digital wallet card 106 such as account number, policy number, account owner name, etc. from the data store 222. The monitoring module 212 may also receive input from the central server 101 indicative of metadata defining the digital wallet card 106. For example, the monitoring module 212, continuously monitoring for updates to the digital wallet card 106, may communicate with the central server 101 and receive therefrom a detection that an update is available for the digital wallet card 106.

The notification module 214 receives one or more inputs from the monitoring module 212 indicative of a change to the digital wallet card 106 including any information held thereon that trigger the notification module 214 to display on the user interface of the mobile computing device 102, a notification message indicating the existence of the update displayed concurrently with an embedded electronic mechanism of updating the digital wallet card 106 such as a hyperlink to a website or native application for processing the update (e.g. the notification 107 shown in FIG. 1 including embedded update link). The notification module 214 may also access one or more notification metadata from the data store 222, including customizable notification settings which define how the notification module 214 may display or otherwise communicate such update notifications to the mobile computing device 102. Thus, the notification module 214 may communicate with the central server 101 and/or configure the mobile computing device 102 to modify how notifications are delivered and displayed on a screen of the mobile computing device 102. Thus, the customizable notification settings stored in the data store 222 may customize the receipt and display of the notification 107. For example, the customizable notification settings may define the delivery method of the notification 107 provided from the central server 101 to be one of an email, SMS, native application message, or on one or more screens of the mobile computing device 102 (e.g. a home screen, a lock screen, etc.).

In at least one implementation, the central server 101 may be polled for updates to one or more fields of the digital wallet card 106 via the monitoring module 212. The central server 101 may then access a policy information database that stores policy information for the account associated with the digital wallet card 106, and upon receiving either continuous or periodic communication prompts from the mobile computing device 102 via the monitoring module 212, detect whether a policy update for the digital wallet card 106 exists based on for example, a comparison of information provided from the mobile computing device 102 to a central policy information database held within the central server 101. The central server 101, upon detecting that a policy update for the digital wallet card 106 exists, communicates to the mobile computing device 102 via the communications network 105 a notification message indicating the existence of an update to digital wallet card 106 and details defining same to the mobile computing device 102. The mobile computing device 102, may process such notification message from the central server 101 via the notification module 214 and thus, causes the notification 107 including the embedded link for accessing the update to be displayed on a user interface of the mobile computing device 102 indicating the existence of the update.

In one example, notification settings data stored within the data store 222 of the mobile computing device 102 may be communicated to the notification module 214 such that notifications of an existence of update to the digital wallet card 106 are to be communicated to the mobile computing device 102 via email only (e.g. and defining one or more email addresses associated therewith). In at least some aspects, email notifications including the notification 107 may also appear on one or more screens of the mobile computing device 102 such as that shown in FIG. 1. In another example, notification settings data stored within the data store 222, may be accessed by the notification module 214 such that the notifications 107 are to be communicated to the mobile computing device 102 by displaying the notification 107 on the lock screen of the mobile computing device 102 (e.g. the lock screen 120 of FIG. 1).

In at least some aspects, the storage device 210 contains instructions that, upon execution by the processor 202, configure the mobile computing device 102 via the notification module 214 to access a set of customizable notification settings stored on the data store 222 for defining how the notification of the update (e.g. the notification 107) is displayed on the user interface (e.g. the lock screen 120).

In at least some aspects, the notification module 214 may be configured to communicate the notification settings (e.g. stored in the data store 222) for receiving updates to the digital wallet 108 including the digital wallet card 106 to the central server 101 in order to customize the notification messages indicative of whether or not an update to the digital wallet card exists as sent by the central server 101. These notification settings may configure at least one of a frequency with which the central server 101 should send the notifications to the mobile computing device 102; and a preferred method of communication for displaying the notification on the mobile computing device 102. The method of communication may define for example that the notification 107 may be communicated from the central server 101 to the mobile computing device 102 via one or more of email, SMS, presentation on a software application on the mobile computing device 102 (e.g. digital wallet management software), and/or display on a particular screen (e.g. lock screen or home screen) of the mobile computing device 102.

Thus, in at least some implementations, the notification module 214 and the monitoring module 212 cooperate such that instructions stored on the storage device 210 configure the mobile computing device 102 to display a notification of an update to the digital wallet card 106 on one or more screens of the user interface of the mobile computing device 102 such as to concurrently display an indication that an update exists (e.g. including details defining the difference between the updated version and current version of the digital wallet card 106) and an embedded link in the notification indication such that when selected (e.g. either manually or automatically triggered), triggers downloading the update thereby automatically replacing the digital wallet card 106 with an updated digital wallet card in the mobile digital wallet 108.

The content management module 218 may be configured to access content formatting information (e.g. stored on the data store 222 and/or the central server 101) such as defining one or more fields required for a particular digital wallet card 106 and digital format for displaying each field which is then used to create the digital wallet card 106. Instructions stored in the storage device 210 may then configure the content management module 218 to, using both formatting information retrieved for the digital wallet card 106 and the policy information package communicated from the central server 101 and stored in the data store 222, to dynamically create the digital wallet card 106 on the mobile computing device 102.

It is understood that operations may not fall exactly within the modules 212, 214, 216, 218 and 222 of FIG. 2 such that one module may assist with the functionality of another.

Figure 3:
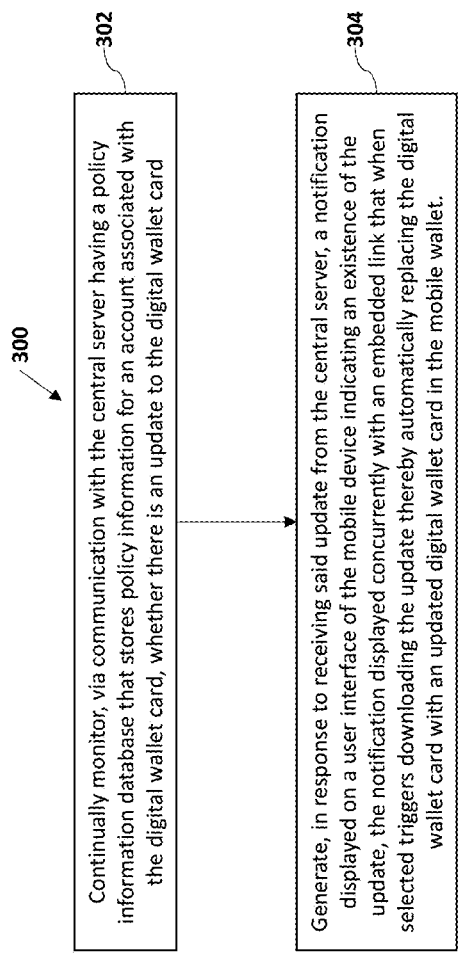
FIG. 3 is a flowchart illustrating example operations of the computing device of FIG. 1, in accordance with one or more aspects of the present disclosure.

FIG. 3 is a flowchart of operations 300 which may be performed by a computing device, such as the mobile computing device 102 illustrated in FIG. 1 and FIG. 2. As described in relation to FIG. 2, the mobile computing device 102 comprises at least one processor 202, configured to communicate with a display to provide a graphical user interface (GUI) where the mobile computing device 102 may include one or more settings to customize the display and wherein computer readable instructions are stored in a non-transient storage device (such as the storage device 210) which when executed by the processor 202, configure the mobile computing device 102 to perform operations such as the operations 300.

At 302, operations instruct the mobile computing device 102 to communicate (e.g. via status check messages) with the central server 101 in FIG. 1 in order to provide a request for determining whether an update exists to a particular digital wallet card. The mobile computing device 102 may provide the request to the central server 101 with account information related to the digital wallet card 106 metadata information such as but not limited to: insurance policy information, type of policy, policy identification number, policy holder information, and policy contract data. The central server 101, having received the request which may include account information from the mobile computing device 102, locates within its policy information database, the policy information specific to that account associated with the digital wallet card 106 and/or the digital wallet 108.

Notably, the operations 302 configure the mobile computing device 102 to communicate with the central server 101 to continuously monitor (e.g. via polling) the policy information database of the central server 101 in order to determine if/when a policy update to the digital wallet card 106 becomes available.

At 304, operations of the mobile computing device 102 configure generating, in response to the update from the central server that updated information exists for the digital wallet card 106, a notification displayed on a user interface of the mobile computing device 102. An example of such notification is shown as the notification 107 in FIG. 1. The notification may be displayed concurrently with an embedded link that when selected (e.g. either manually via a user 116 of FIG. 1 or automatically based on settings in the mobile computing device 102) triggers downloading the update to the digital wallet card 106 thereby automatically replacing the digital wallet card with an updated card in the digital wallet 108.

In at least some aspects, at 304, the mobile computing device 102 may be configured (e.g. via the notification module 214) to determine, based on one or more customizable notification settings of the mobile computing device 102, a preferred receipt method for receiving a potential notification of the update to the digital wallet card 106 on the mobile computing device 102 from the central server 101. These notification settings may be stored within the data store 222 and may be customizable via the user interface of the mobile computing device 102. These notification settings may determine a frequency with which the mobile computing device 102 should receive notifications, and/or a preferred receipt method for displaying the notification on the mobile computing device 102, the receipt method including one or more of either email, SMS, a notification presented on a software application on the mobile computing device 102, and a notification displayed on one or more specific screens of mobile computing device 102.

In at least some aspects, the instructions may configure the mobile computing device 102 such that the notification settings for the digital wallet 108 is communicated to the central server 101 via the communications network 105. Notification setting configuration updates are subsequently communicated to the central server 101 every time that the notification setting configurations are changed for the mobile computing device 102. In this way, the central server 101 is consistently communicating notifications (e.g. notification 107) to the mobile computing device 102 based on the current notification settings stored within the storage device of mobile computing device 102.

The central server 101, upon receiving a request from the mobile computing device 102 for an update, may determine whether an update to the digital wallet card 106 is available, and communicates, in real time, this policy update information to the mobile computing device 102 via the communications network 105 for subsequent display thereon.

In one aspect of operation 302, the mobile computing device 102 may be configured to send intermittent status check messages to the central server 101 comprising current account information in the digital wallet card 106 in order to determine whether an update to the digital wallet card 106 is available. According to this aspect, the mobile computing device 102 may, on a predetermined basis (for example, daily), communicate with the central server 101 the account information associated with the digital wallet card 106. The central server 101, having received this account information from the mobile computing device 102, and having access to a database of policy information having real time information for the account and policies enrolled, would automatically check the policy information database in order to determine whether an update is available to the digital wallet card 106 based on the associated account information.

If the central server 101 discovers that an update is available to the digital wallet card 106, then the central server 101 will communicate, based on the notification settings communicated from the mobile computing device 102 to the central server 101, that policy update information in the form of a notification (e.g. the notification 107) to the mobile computing device 102. If the central server 101 discovers that no update is available to the digital wallet card 106, then the central server 101 may not communicate any information back to the mobile computing device 102 or communicate a "no update" message back.

In another aspect of operation 304, the notification settings may be communicated to the central server 101 that the notification settings on the mobile computing device 102 specify that notifications are to be displayed directly on the lock screen of the user interface of the mobile computing device 102. According to this aspect, the mobile computing device 102, having received the notification update from the central server 101 according to the notification settings communicated by the notification module 214, displays the notification 107 and embedded update link directly onto the lock screen of the mobile computing device 102. In this example, the instructions executed by the processor further configure the mobile computing device 102 to automatically trigger the update download link embedded in the notification 107 displayed on the lock screen of the mobile computing device 102, thus automatically updating the digital wallet card 106 to the new digital wallet card (e.g. based on notification settings indicating automatic download of the updated digital wallet card 106).

In another aspect of operation 304, the notification settings on the mobile computing device 102 may be customized such that notifications are to be sent directly to an email address associated with the mobile computing device 102. The notification email sent directly from the central server 101 to the email address connected to the mobile computing device 102 would contain within it an embedded link that, when triggered, updates the digital wallet card 106 to the new digital wallet card containing updated policy information.

In another aspect of operation 304, the notification settings on mobile computing device 102 may indicate that notifications are to be sent to the digital wallet card 106 directly, and displayed only within the digital wallet 108 application on the mobile computing device 102. According to this aspect, the update notification and embedded update link would be displayed on the user interface within the digital wallet 108 application, with the update link available such that when triggered the digital wallet card 106 would automatically update to the updated policy.

In another aspect of operation 304, the notification settings contained in the data store 222 of the mobile computing device 102 may specify a frequency with which update notifications are to be communicated to the mobile computing device 102. The mobile computing device 102 notification settings may specify, in one example, that notification updates are to be communicated to the mobile computing device 102 every day at a certain hour until the embedded update link is triggered thus updating the digital wallet card 106 to the updated policy. This frequency information, combined with the method of notification that is also stored within the mobile computing device 102 notification module, can cooperate to create a number of methods that update notifications are communicated to the mobile computing device 102 from the central server 101.

In one further aspect of operation 300, the central server 101 may communicate policy update notifications to more than one mobile computing device where the multiple mobile computing devices contain the digital wallet card 106 and its corresponding account information within their digital wallets. As described in more detail in operation 400, the digital wallet card 106 may be created on the mobile computing device 102 and then shared with additional mobile computing devices. In this aspect, the central server 101 may be configured to communicate with the number of mobile computing devices where the mobile computing devices have stored within their digital wallets a copy of the digital wallet card 106, and the corresponding account and policy information contained within them. In this way, the central server 101 may communicate via the communications network 105 policy update information to the mobile computing device 102 and the additional mobile computing devices concurrently.

In at least some implementations, policy update notifications communicated from the central server 101 to the mobile computing device 102 and additional mobile computing devices are communicated in accordance with the specific notification settings of each mobile computing device. For example, the notification settings contained within the notification module of the mobile computing device 102 may specify that update notifications related to the digital wallet card 106 communicated from the central server 101 are to be communicated once daily in the form of the notification 107 having an embedded link directly onto the lock screen of the mobile computing device 102. The notification settings contained within the additional mobile computing device, however, may specify in one example, that update notifications related to the digital wallet card 106 communicated from the central server 101 are to be communicated periodically in the form of an email with an embedded update link directly to the email address associated with that additional mobile computing device. According to this example, several different mobile computing devices may, through continuous communication with the central server 101 that is connected to the one entity account and continuously monitoring for updates to said account, receive update notifications from central server 101 in various different formats and frequencies depending on the specifications of each individual mobile computing device.

Figure 4:
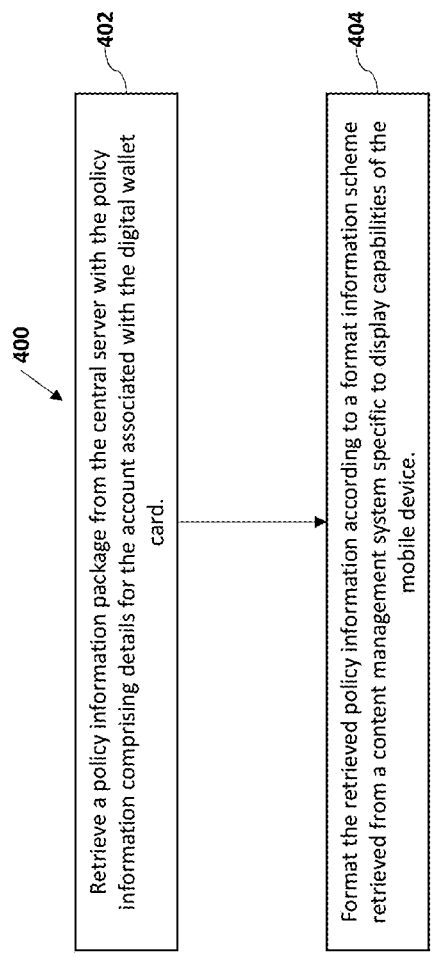
FIG. 4 is a flowchart illustrating example operations of the computing device of FIG. 1, in accordance with one or more aspects of the present disclosure.

FIG. 4 is a flowchart of operations 400 which may be performed by a computing device, such as the mobile computing device 102. Operations 400 outline the process by which the digital wallet card 106 is created on the mobile computing device 102.

At 402, operations of the mobile computing device 102 instruct the mobile computing device 102 to communicate with the central server 101 in order to provide the central server 101 with account information that will be used to create the digital wallet card 106 representation of a physical card such as an insurance card. This account information may be received at the mobile computing device 102 through manual entry via the user interface on the mobile computing device 102, or else via the content management system 104 through a scan such as a photo of the physical card. The central server 101, having received the account information from the mobile computing device 102, locates within its database of policy information the policy information specific to that particular account associated with the physical insurance card. The central server 101 then communicates back to the mobile computing device 102 a policy information package containing relevant policy details in relation to the account associated with the physical insurance card.

At 404, the content management system 104 communicates to the mobile computing device 102 (e.g. either directly or via the central server), a format information scheme to determine how the digital wallet card 106 should be electronically displayed according to the display capabilities specific to the mobile computing device 102, this format information scheme being stored in the form of instructions in the storage device. These instructions configure the mobile computing device 102 to display the policy information communicated via the central server 101, in accordance with the format information scheme communicated via the content management system 104, in order to create the digital wallet card 106 on the mobile computing device 102. The digital wallet card 106 may be created in the form of a PKPass file within the digital wallet on the mobile computing device 102.

In one aspect of operations 400, the digital wallet card 106, created on the mobile computing device 102, may be shared with other mobile computing devices. In this way, the digital wallet card 106 and the insurance information that it contains can be simultaneously housed on multiple mobile computing devices that have one insurance policy account in common.

In at least some implementations, the digital wallet card 106 may be communicated from one mobile computing device to another mobile computing device through a communications network (e.g. the communications network 105). Once the digital wallet card 106 is created on the mobile computing device 102, the mobile computing device 102 causes the account information, policy information, and formatting information stored thereon for the digital wallet card 106, to be communicated to another related mobile computing device. This second related mobile computing device may, upon receiving the formatting information, account information, and policy information from the mobile computing device 102, re-create the digital wallet card 106 within its respective mobile wallet. The digital wallet card 106, having been communicated to another mobile computing device, would then be available on both the mobile computing device 102 and the selected other mobile computing device, such that both devices are able to display the digital wallet card 106 on the user interface of both respective mobile computing devices.

In another aspect of operation 400, the digital wallet card 106 generated may be displayed on the user interface of the mobile computing device 102 with or without unlocking or otherwise accessing the mobile computing device 102 beyond the lock screen.

In one further example, the digital wallet card 106 can be created in relation to a variety of forms of insurance, including home insurance, auto insurance, tenant insurance, etc. In addition, according this example aspect of operations 400, multiple separate digital wallet cards can be created within the digital wallet 108. Operations 400 may be repeated such that two distinct digital wallet cards are created, one in relation to a home insurance account, and another in relation to a driving insurance account. These two digital wallet cards would be distinct within the digital wallet 108. In this example, the mobile computing device 102 may be configured to request from the central server 101, having access to a database of policy information, updates to multiple digital wallet cards 106 and in response to notifications about said updates, generate notification messages on the display of the mobile computing device 102 in relation to both the home insurance account and the driving insurance account according to processes described in operations 300.

Figure 5:
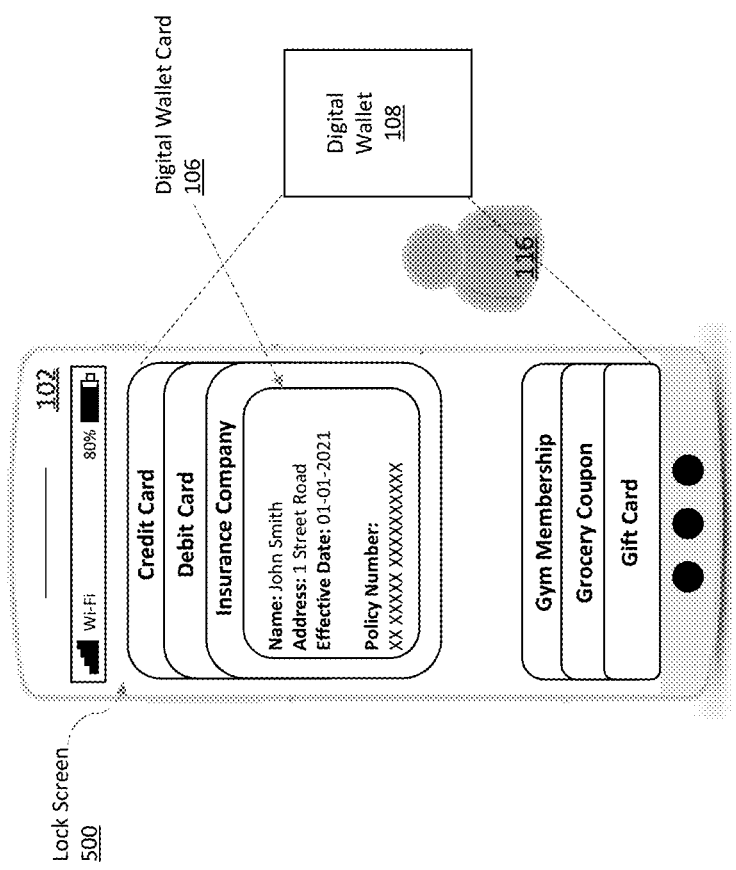
FIG. 5 is a diagram illustrating in further detail the example computing device of FIG. 1, in accordance with one or more aspects of the present disclosure.

FIG. 5 is a diagram illustrating the digital wallet card 106 displayed on a graphical user interface in accordance with one or more aspects of the present disclosure.

Notably, FIG. 5 illustrates the mobile computing device 102 presenting a user interface to further access the digital wallet 108 and contents therein including the digital wallet card 106 as shown in view 502. As shown, the digital wallet card 106 is displayed on a home screen such as a second lock screen 500 of the mobile computing device 102. When displayed on the second lock screen 500, as opposed to upon navigating to one or more native applications (e.g. a wallet application storing the digital wallet 108) which require unlocking the mobile computing device 102, then the mobile computing device 102 remains locked while displaying the digital wallet card 106 including wallet card information such as customer name, address, policy information and effective date relating to the account(s) associated with the digital wallet card 106.

According to FIG. 5, the digital wallet card 106, generated in accordance with operations 300 of FIG. 3 and/or 400 of FIG. 4, may be accessed via the digital wallet 108 within the second lock screen 500 of the mobile computing device 102. As shown in view 502, the mobile computing device 102 may display on the second lock screen 500 of its user interface the digital wallet 108, including, within it, the digital wallet card 106. The digital wallet card 106 may thus be displayed as one in a number of digital wallet cards within the mobile digital wallet 108, e.g., concurrently with bank cards and other digital cards which may be carried in the digital wallet 108.

In one aspect, multiple digital wallet cards in relation to insurance can be displayed on the second lock screen 500 depending on how many different digital wallet cards in relation to insurance have been created on the mobile computing device 102. For example, the mobile digital wallet 108 may have both a digital wallet card for a vehicle insurance account, and an associated digital wallet card for a home insurance account, whereby the accounts may be linked. According to this aspect, both the vehicle insurance and the house insurance digital wallet cards may be displayed concurrently on the second lock screen 500, with key identification information of both cards available to display prominently on the user interface. In at least some aspects, as described above, updates to one digital wallet card as received from the central server 101 described in FIG. 1 may be perpetuated to multiple associated digital wallet card having linked account information. In such a way, the notification 107 shown in FIG. 1 may also similarly display a concurrent notification for multiple related digital wallet cards.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-searchable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using wired or wireless technologies, such are included in the definition of medium. It should be understood, however, that computer-readable storage media and data storage media do not include connections, carrier waves, signals, or other media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor", as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

One or more currently preferred embodiments have been described by way of example. It will be apparent to persons skilled in the art that a number of variations and modifications can be made without departing from the scope of the invention as defined in the claims.

What is claimed is:

1. A mobile computing device communicating with a central server in order to manage a digital wallet card within a mobile wallet on the mobile computing device, the mobile computing device comprising a processor, a storage device, and a communication device where each of the storage device, and the communication device is coupled to the processor, the mobile computing device's storage device storing instructions, which when executed by the processor, configure the mobile computing device to:

continually monitor, via communication messages comprising information identifying the digital wallet card, sent by a monitoring module of the mobile computing device on a periodic basis, to the central server having a policy information database that stores policy information for various accounts of an entity, the central server storing policy information for an account associated with the digital wallet card being a dynamic electronic representation of a physical card in the policy information database and the central server triggered for automatically checking the policy information database upon receiving the communication messages initiated by the monitoring module of the mobile computing device, whether there is an update in the policy information database of the central server to the policy information on the digital wallet card; and automatically generate, upon receiving from the central server both an indication that the update exists and a set of metadata for updating the digital wallet card in response to the communication messages initiated periodically by the monitoring module of the mobile computing device for the central server, a notification displayed on a lock screen of a user interface of the mobile computing device indicating an existence of the update in real-time, the notification displayed concurrently on the lock screen with an embedded website update link displayed on the mobile computing device that when selected automatically triggers downloading the update from the central server thereby automatically replacing the digital wallet card with an updated digital wallet card in the mobile wallet reflecting the update to the policy information, wherein the communication messages comprise a status check message, the status check message comprising current account information in the digital wallet card for determination of whether the update exists for the digital wallet card based on the policy information stored on the central server, wherein the current account information comprises insurance policy information.

2. The mobile computing device of claim 1, wherein upon receiving the notification and the embedded link, the instructions configure the mobile computing device to automatically select the embedded link and thereby automatically update the digital wallet card to the updated digital wallet card based on said update including policy amendment information reflecting a policy change for the account.

3. The mobile computing device of claim 1, wherein the instructions further configure the mobile computing device to: store a set of customizable notification settings on a storage device of the mobile computing device, the notification settings displayed and customizable via the user interface of the mobile computing device for defining how the notification of the update is displayed on the user interface.

4. The mobile computing device of claim 3, wherein the instructions configure the mobile computing device to communicate the notification settings, customizable via the user interface of the mobile computing device, with the central server for customizing the notifications.

5. The mobile computing device of claim 4, wherein the notification settings communicated with the central server defines at least one of:

a frequency with which to receive the notification; and an additional receipt method for displaying the notification on the mobile computing device, the receipt method consisting of: email, SMS, and presented on a software application on the mobile computing device.

6. The mobile computing device of claim 1, wherein the digital wallet card represents a physical card and is created on the mobile wallet by the instructions configuring the mobile computing device to:

retrieve a policy information package from the central server with the policy information comprising details for the account associated with the digital wallet card; and format the retrieved policy information according to a format information scheme retrieved from a content management system (CMS) specific to display capabilities for the mobile computing device.

7. The mobile computing device of claim 6, wherein the digital wallet card represents an electronic representation of a vehicle insurance card.

8. The mobile computing device of claim 6, wherein the instructions further configure the mobile computing device to share updates to the digital wallet card with other related mobile computing devices having respective digital wallet card associated with a shared policy.

9. The mobile computing device of claim 1, wherein the digital wallet card is displayed on a lock screen of the mobile computing device without unlocking the mobile computing device.

10. A computer implemented method for managing a digital wallet card within a mobile wallet of a mobile computing device, the method comprising:

continually monitoring, via communication messages comprising information identifying the digital wallet card, sent by a monitoring module of the mobile computing device on a periodic basis, to a central server having a policy information database that stores policy information for various accounts of an entity, the central server storing policy information for an account associated with the digital wallet card in the policy information database and the central server triggered for automatically checking the policy information database upon receiving the communication messages initiated by the monitoring module of the mobile computing device, whether there is an update in the policy information database of the central server to the policy information on the digital wallet card; and automatically generating, upon receiving from the central server both an indication that the update exists and a set of metadata for updating the digital wallet card in response to the communication messages initiated periodically by the monitoring module of the mobile computing device for the central server, a notification displayed on a lock screen of a user interface of the mobile computing device indicating an existence of the update in real-time, the notification displayed concurrently on the lock screen with an embedded website update link, displayed on the mobile computing device, that when selected automatically triggers downloading the update from the central server thereby automatically replacing the digital wallet card with an updated digital wallet card in the mobile wallet reflecting the update to the policy information, wherein the communication messages comprise a status check message, the status check message comprising current account information in the digital wallet card for determination of whether the update exists for the digital wallet card based on the policy information stored on the central server, wherein the current account information comprises insurance policy information.

11. The method of claim 10, wherein upon receiving the notification and the embedded link, automatically selecting the embedded link and thereby automatically updating the digital wallet card to the updated digital wallet card based on said update including policy amendment information reflecting a policy change for the account.

12. The method of claim 10, further comprising: storing a set of customizable notification settings on a storage device of the mobile computing device, the notification settings displayed and customizable via the user interface of the mobile computing device for defining how the notification of the update is displayed on the user interface.

13. The method of claim 12, further comprising communicating the notification settings, customizable via the user interface of the mobile computing device, with the central server for customizing the notifications received on the mobile computing device.

14. The method of claim 13, wherein the notification settings communicated with the central server defines at least one of:
   a frequency with which to receive the notification; and
   an additional receipt method for displaying the notification on the mobile computing device, the receipt method consisting of: email, SMS, presented on a software application on the mobile computing device.

15. The method of claim 10, wherein the digital wallet card represents a physical card and is created on the mobile wallet by:
   retrieving a policy information package from the central server with the policy information comprising details for the account associated with the digital wallet card; and
   formatting the retrieved policy information according to a format information scheme retrieved from a content management system (CMS) specific to display capabilities for the mobile computing device.

16. The method of claim 15, wherein the digital wallet card represents an electronic representation of a vehicle insurance card.

17. The method of claim 15, further comprising sharing updates to the digital wallet card with other related mobile computing devices having respective digital wallet card associated with a shared policy.

18. The method of claim 10, wherein method comprises displaying the digital wallet card on a lock screen of the mobile computing device without unlocking the mobile computing device.

19. A computer program product for using a mobile computing device to communicate with a central server in order to manage a digital wallet card within a mobile wallet on the mobile computing device, the computer program product comprising a non-transient storage device storing instructions that when executed by at least one processor of the mobile computing device, configure the mobile computing device to:
   continually monitor, via communication messages comprising information identifying the digital wallet card, sent by a monitoring module of the mobile computing device on a periodic basis, to a central server having a policy information database that stores policy information for various accounts of an entity, the central server storing policy information for an account associated with the digital wallet card being a dynamic electronic representation of a physical card on the mobile wallet of the mobile computing device in the policy information database and the central server triggered for automatically checking the policy information database upon receiving the communication messages initiated by the monitoring module of the mobile computing device, whether there is an update in the policy information database of the central server to the policy information on the digital wallet card; and
   automatically generate, upon receiving from the central server both an indication that the update exists and a set of metadata for updating the digital wallet card in response to the communication messages initiated periodically by the monitoring module of the mobile computing device for the central server, a notification displayed on a lock screen of a user interface of the mobile computing device indicating an existence of the update in real-time, the notification displayed concurrently on the lock screen with an embedded website update link displayed on the mobile computing device that when selected automatically triggers downloading the update from the central server thereby automatically replacing the digital wallet card with an updated digital wallet card in the mobile wallet reflecting the update to the policy information,
   wherein the communication messages comprise a status check message, the status check message comprising current account information in the digital wallet card for determination of whether the update exists for the digital wallet card based on the policy information stored on the central server, wherein the current account information comprises insurance policy information.

* * * * *